US012644326B2

(12) United States Patent
Forthaus et al.

(10) Patent No.: US 12,644,326 B2
(45) Date of Patent: Jun. 2, 2026

(54) LEADING CLOSING EDGE SAFETY ARRANGEMENT FOR A DOOR DEVICE AND DOOR DEVICE

(71) Applicant: CEDES AG, Landquart (CH)

(72) Inventors: Martin Forthaus, Pulheim (DE); Konrad Machill, Cologne (DE)

(73) Assignee: CEDES AG, Landquart (CH)

( * ) Notice: Subject to any disclaimer, the term of this patent is extended or adjusted under 35 U.S.C. 154(b) by 0 days.

(21) Appl. No.: 18/084,595

(22) Filed: Dec. 20, 2022

(65) Prior Publication Data

US 2023/0193680 A1 Jun. 22, 2023

(30) Foreign Application Priority Data

Dec. 21, 2021 (DE) ..................... 10 2021 134 132.9

(51) Int. Cl.
*E05F 15/46* (2015.01)
*E05F 15/43* (2015.01)
*E05F 15/48* (2015.01)

(52) U.S. Cl.
CPC .............. *E05F 15/46* (2015.01); *E05F 15/43* (2015.01); *E05F 15/48* (2015.01); *E05F 2015/435* (2015.01); *E05Y 2400/54* (2013.01); *E05Y 2900/106* (2013.01)

(58) Field of Classification Search
CPC . E05F 15/46; E05F 15/43; E05F 15/48; E05F 2015/435
See application file for complete search history.

(56) References Cited

U.S. PATENT DOCUMENTS 5,233,185 A * 8/1993 Whitaker ................ E05F 15/43 250/227.21
5,625,980 A * 5/1997 Teich ................ H04W 52/0254 49/25
5,743,320 A * 4/1998 McKeon ................... E06B 9/82 49/27
6,082,046 A * 7/2000 Simmons .............. E05F 15/668 49/28
6,176,039 B1 * 1/2001 Craig ...................... E05F 15/43 49/197

(Continued)

FOREIGN PATENT DOCUMENTS

DE 10 2006 026 698 * 12/2006
DE 10 2005 061 555 * 3/2007

(Continued)

*Primary Examiner* — Gregory J Strimbu
(74) *Attorney, Agent, or Firm* — Norman B. Thot

(57) ABSTRACT

A leading closing edge safety arrangement for a vertically movable door device having door panel elements. The leading closing edge safety arrangement includes a sensor arrangement which defines an optical signal path, and an optical signal path interrupting element. The sensor arrangement has a coupling device on a left and a coupling device on the right door side region of the lower door end region. A first one of the coupling devices has a transmitter, and a second one of the coupling devices has a receiver. One or both of the coupling devices has a switching arrangement having a switch which switches the transmitter and/or the receiver so that no current flows therethrough at least in a lower end position of the vertically movable door device.

16 Claims, 5 Drawing Sheets

(56) References Cited

U.S. PATENT DOCUMENTS

| | | | | |
|---|---|---|---|---|
| 7,157,689 | B1 * | 1/2007 | Schmidt | E05F 15/43 250/221 |
| 11,781,363 | B2 * | 10/2023 | Lilienthal | H03M 1/12 318/563 |
| 2002/0046494 | A1 * | 4/2002 | Miller | H03K 17/94 49/26 |
| 2005/0224195 | A1 | 10/2005 | Hormann et al. | |
| 2005/0253710 | A1 * | 11/2005 | Eskildsen | G08B 13/08 340/545.8 |
| 2006/0071624 | A1 * | 4/2006 | Fitzgibbon | E05F 15/46 318/478 |
| 2023/0193680 | A1 * | 6/2023 | Forthaus | E05F 15/43 49/27 |

FOREIGN PATENT DOCUMENTS

| | | | |
|---|---|---|---|
| DE | 10 2008 026 260 | A1 | 12/2009 |
| DE | 20 2018 006 207 | U1 | 9/2019 |
| EP | 1 972 747 | * | 9/2008 |

* cited by examiner

LEADING CLOSING EDGE SAFETY ARRANGEMENT FOR A DOOR DEVICE AND DOOR DEVICE

CROSS REFERENCE TO PRIOR APPLICATIONS

Priority is claimed to German Patent Application No. DE 10 2021 134 132.9, filed Dec. 21, 2021. The entire disclosure of said application is incorporated by reference herein.

FIELD

The present invention refers to a leading closing edge safety arrangement for a vertically movable door device which has at least one door panel element and which comprises a lower door end region, as viewed in the vertical direction, wherein at least one coupling device to be attached is provided on the left-hand and right-hand side regions of the lower door end region, respectively, wherein the first coupling device provides at least one transmitter and the second coupling device provides at least one receiver as part of a sensor arrangement for defining an optical signal path, and wherein an optical signal path interrupting element is provided for interrupting the optical signal path at least in a first, lower end position in which the door end region comes into contact with a floor surface. The present invention is also directed to a door device having a leading closing edge safety arrangement.

BACKGROUND

Leading closing edge safety arrangements for a vertically movable door device have previously been described. These closing edge safety arrangements have the major advantage that they stop the door drive even when the door panel elements are moving rapidly if the optical signal path is interrupted, for example, by people or by a vehicle. An optical sensor arrangement is provided at a distance from the lower door end region for this purpose. To prevent the optical sensor arrangement from being damaged when the door panel element hits a floor surface, coupling devices are provided on the left and right door side regions of the lower door end region which include the respective transmitters and receivers of the sensor arrangement and which are configured so that they comprise parts which flip in or out when they come into contact with the floor surface.

An example of a leading closing edge safety arrangement with a coupling device which flips away the sensor arrangement is described in DE 10 2004 014 182 B4. In contrast, leading closing edge safety arrangements in which the sensor arrangement is folded or pushed into a housing by the coupling devices are described in DE 10 2008 026 260 A1 and in DE 20 2018 006 207 U1. The housing parts in this case serve as an optical signal path interrupting element to interrupt the optical signal path when a lower end position is arrived at. This avoids malfunctions of the sensor arrangement in the end position. Adjacent sensor arrangements can also no longer be disturbed by a transmitter that is in the end position but still emits light. A further advantage is that a control device, if present, detects the end position due to the interruption of the optical signal path. Such closing edge safety devices have the disadvantage, however, that the movable parts of the respective coupling devices, such as the housing parts to be pushed into each other, can become jammed or wedged, which results in the optical signal path not being able to be re-established when the door is restarted, which in turn immediately stops the drive of the door device.

SUMMARY

An aspect of the present invention is to avoid the above-mentioned disadvantage in a simple and cost-effective manner.

In an embodiment, the present invention provides a leading closing edge safety arrangement for a vertically movable door device which comprises at least one door panel element and which, when viewed in a vertical direction, comprises a lower door end region. The leading closing edge safety arrangement includes a sensor arrangement for defining an optical signal path, and an optical signal path interrupting element at least in a first lower end position in which the lower door end region comes into contact with a floor surface. The sensor arrangement comprises at least one coupling device on each of a left door side region and a right door side region of the lower door end region. The at least one coupling device comprises a first coupling device which comprises at least one transmitter, and a second coupling device which comprises at least one receiver. At least one of the first coupling device and the second coupling device comprise(s), as the optical signal path interrupting element, a switching arrangement which comprises at least one switch to be triggered. The switching arrangement is configured to switch at least one of the at least one transmitter and the at least one receiver current-free at least in the first lower end position.

BRIEF DESCRIPTION OF THE DRAWINGS

The present invention is described in greater detail below on the basis of embodiments and of the drawings in which.

DETAILED DESCRIPTION

Figure 1:
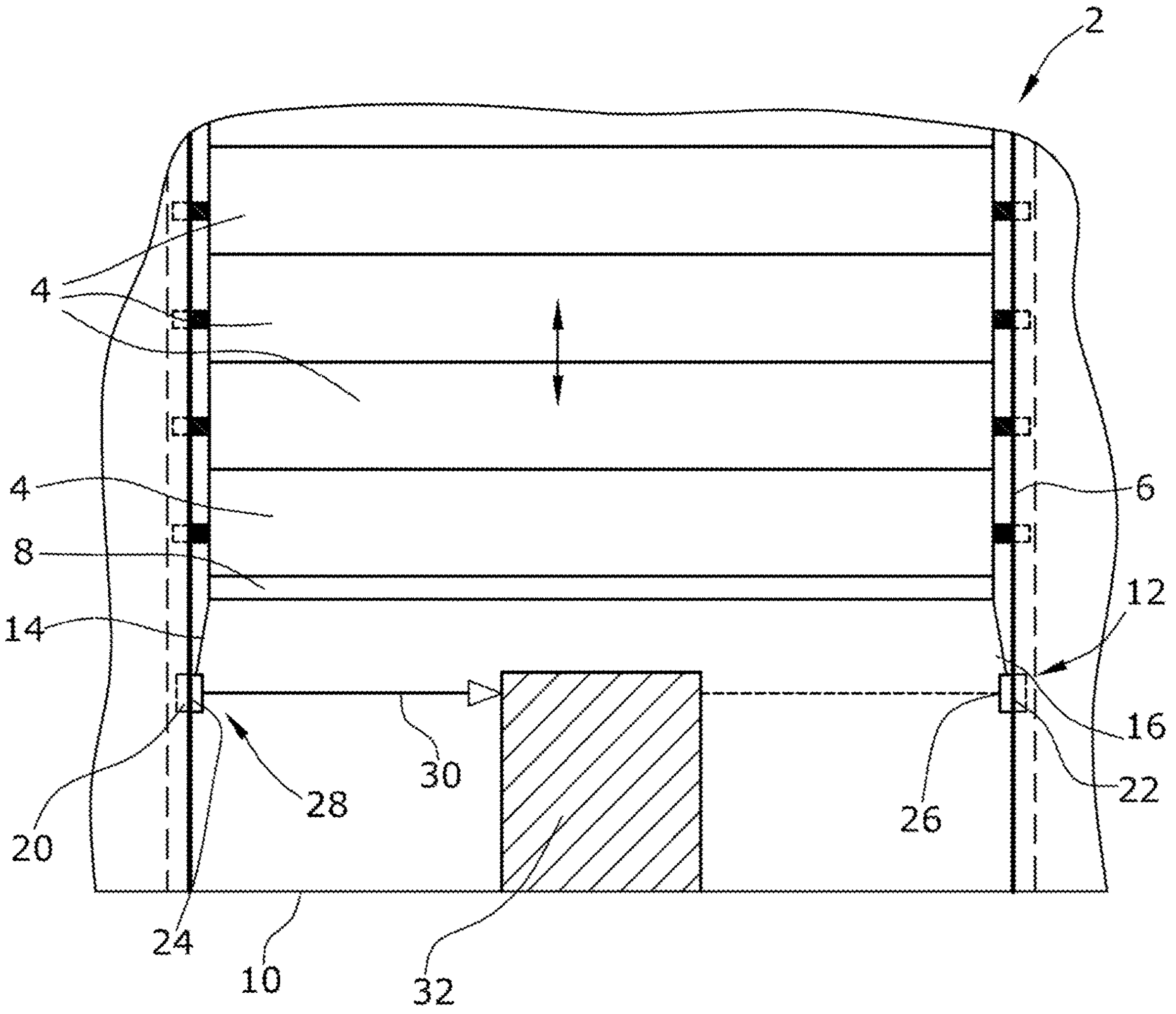
FIG. 1 shows a schematic front view of a door device according to the present invention.

The present invention provides the first and/or the second coupling device with a switching arrangement as an optical signal path interrupting element, which comprises at least one switch to be actuated, which switches the sensor and/or receiver current-free at least in the first lower end position. This provides an interruption of the optical signal path at least in the lower end position in the simplest way, wherein the risk of malfunctions is eliminated to the greatest possible extent. The leading closing edge safety arrangement according to the present invention also provides the advantage that no current is consumed by the sensor arrangement during the movement of the door device in the end position. This is particularly important for sensor arrangements that are supplied with power by a rechargeable battery.

In an embodiment of the present invention, the switching arrangement can, for example, be configured as a tilt switching arrangement which switches the transmitter and/or the receiver current-free depending on the position of the coupling device in relation to the earth's gravitational field. The configuration of the switching arrangement can thereby once again be substantially simplified, wherein the functional availability is provided in any operating situation of the door device.

The switching arrangement can, for example, provide a MEMS gravity sensor. The tilt switching arrangement can, however, be provided in an even simpler and more cost-effective manner by providing at least one switching element configured as a tilt switch. The tilt switch can in this case, for example, be configured as an electromechanical tilt switch which provides a movably supported metal ball or a movably supported metal cylinder.

In an embodiment of the present invention, at least one coupling device can, for example, provide control electronics for the sensor arrangement. Both the MEMS gravity sensor or the tilt switch can be provided in the control electronics.

In order to avoid interruptions in the power supply due to the slightest vibrations, the switching arrangement can, for example, provide a capacitor as a current buffer. In order to be able to continue using standard parts, the tilt switch and the capacitor are advantageously arranged in a positioning element remote from the control electronics. The positioning element is in particular used to determine the position of the tilt switch in a defined manner. The positioning element can be configured as a pre-assembly element and can be detachably or non-detachably fixed in the coupling device.

In order to provide a simple and safe folding away of the sensor arrangement, the coupling device provides a main body to be attached to the door side region and two lever arms which are movably attached thereto and which provide connecting elements to interconnect the lever arms in an end position. The first lever arm can in this case, for example, comprise the transmitter or receiver and the switching arrangement, and the second lever arm can, for example, provide a contact surface or a contact element for making contact with the floor surface, wherein the second lever arm has a projection d relative to the first lever arm. The provision of two lever arms, one of which provides the transmitter or receiver and the switching arrangement, provides that this lever arm is not exposed to contact or vibration in any operating situation. Contact with the floor surface is provided by the second lever arm. The contact element can in this case be configured as a roller element.

The connecting elements, which forces the first lever arm to move when the second lever arm contacts the ground, can, for example, be configured as a pin and a groove.

The present invention is also directed to a door device having a leading closing edge safety arrangement of this type.

Several successive door panel elements may in this case be provided, defining a sectional door.

Guide surfaces for the coupling device can be provided in the upper end position in order to also switch the sensor arrangement current-free in a second, upper end position.

The present invention is explained in greater detail below under reference to the drawings.

FIG. 1 shows a door device 2 according to the present invention, which is configured as a sectional door with several sequential door panel elements 4. The door panel elements 4 are provided movably in a known manner in laterally extending guide rails 6. The door device 2 also provides a lower door end region 8, which in the present case is configured as a separate closing edge. It is also, however, possible for such a closing edge 8 to be configured by the underside of a door panel element 4. The closing edge 8 comes into contact with a floor surface 10 when the door device 2 is closed. In order to now stop the movement of the door device 2, and thus a drive device (which is not further shown in the drawings) in the event of obstacles occurring in the path of travel of the door panel elements 4, a leading closing edge safety arrangement 12 is provided which can detect obstacles at a distance from the closing edge 8.

It should be noted that in the present case, the distance between the closing edge 8 and the leading closing edge safety arrangement 12 has been chosen to be particularly large for the sake of clarity. The leading closing edge safety arrangement 12 provides a coupling device 20, 22 on both the left-hand and right-hand door side regions 14, 16 of the lower door end region 8, respectively. A transmitter 24 is here arranged in the coupling device 20 and a receiver 26 is arranged in the coupling device 22, which together constitute a sensor arrangement 28 and thus define an optical signal path 30. If, as shown in FIG. 1, the optical signal path 30 is interrupted by an obstacle 32, the door device 2 is stopped without collision.

Figure 2:
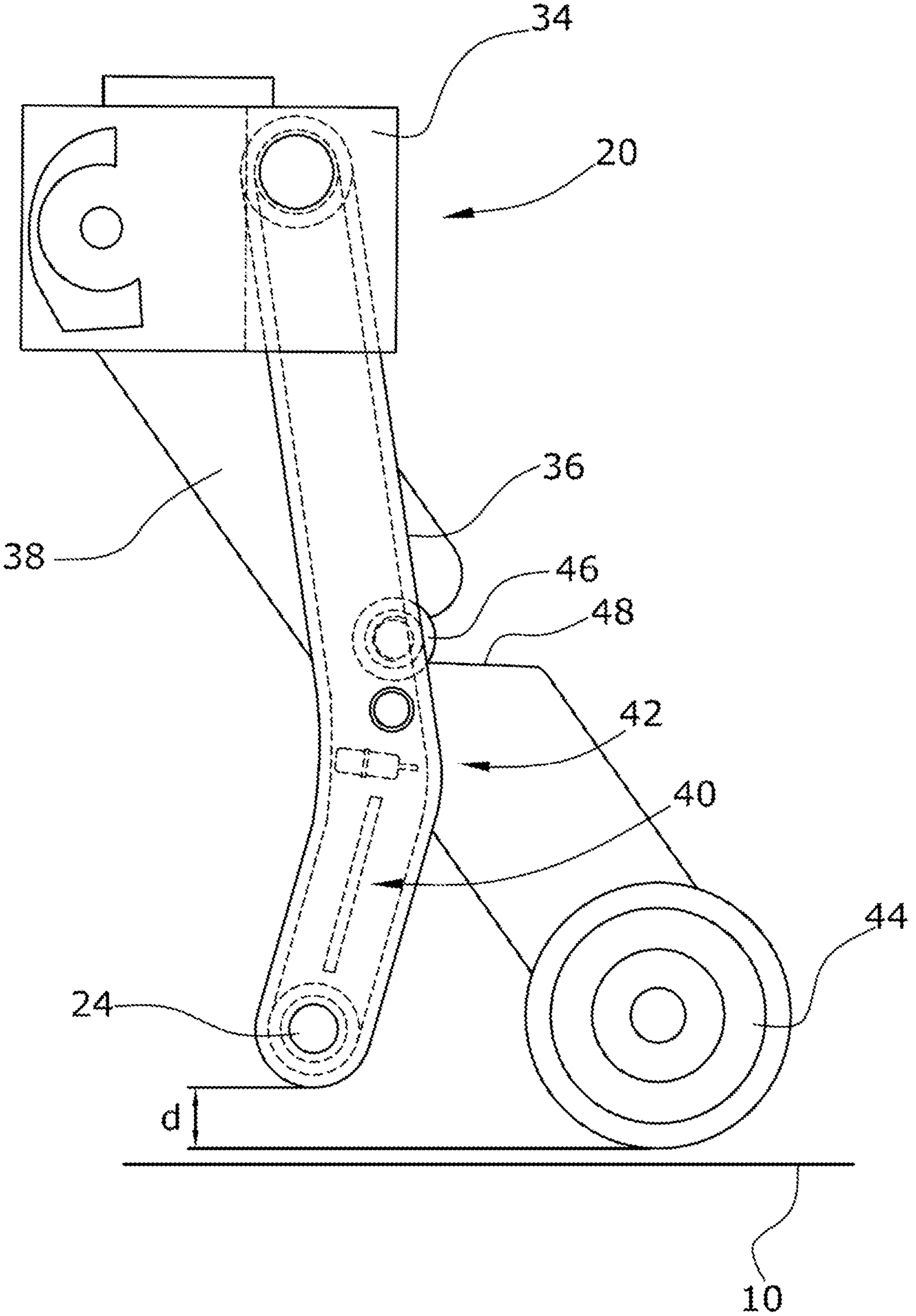
FIG. 2 shows a side view of a coupling device of a leading closing edge safety arrangement according to the present invention in a position in which the door moves at a distance from a floor surface.
Figure 3:
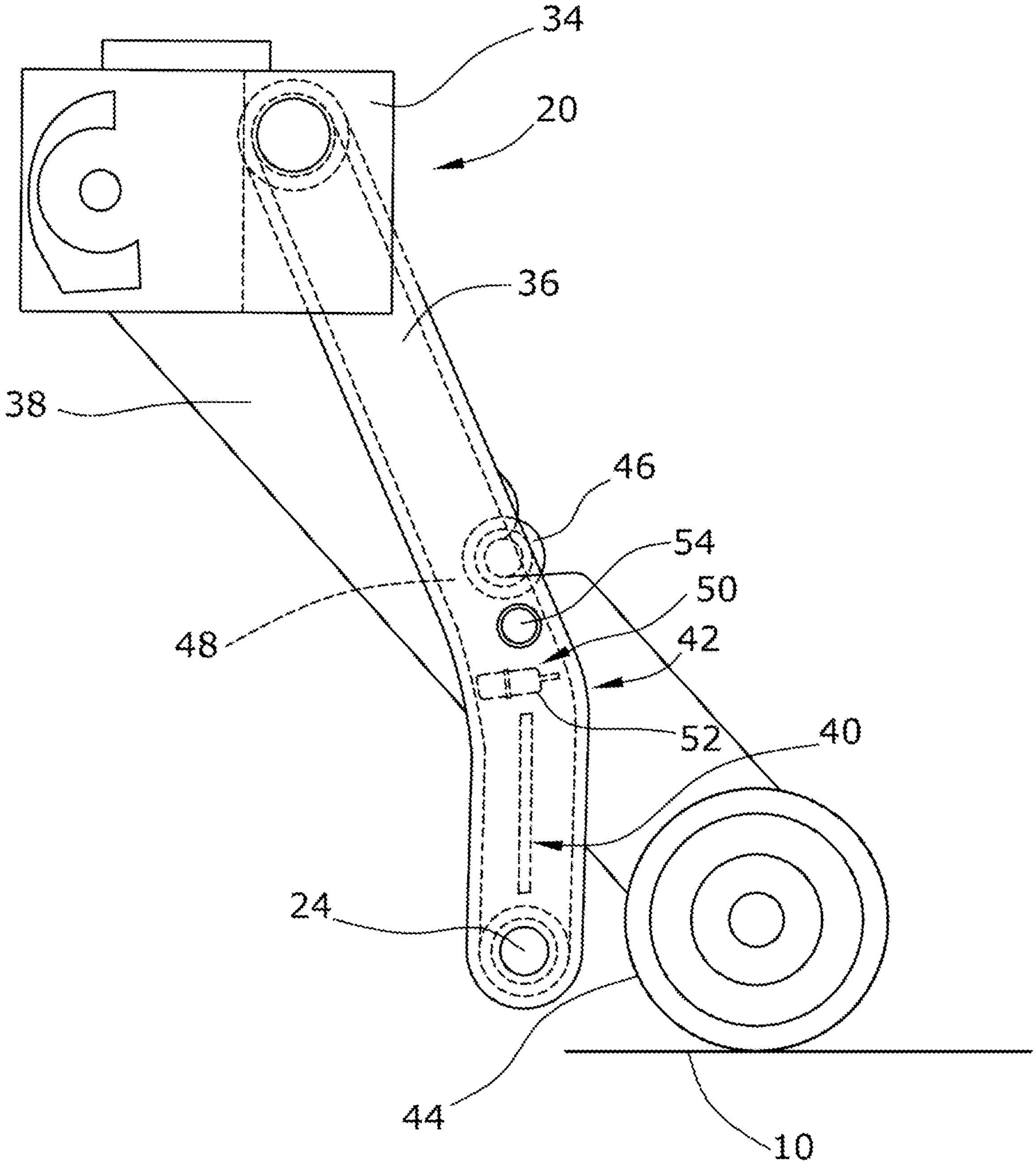
FIG. 3 shows a side view of the coupling device of FIG. 2 after contact with the floor surface.
Figure 4:
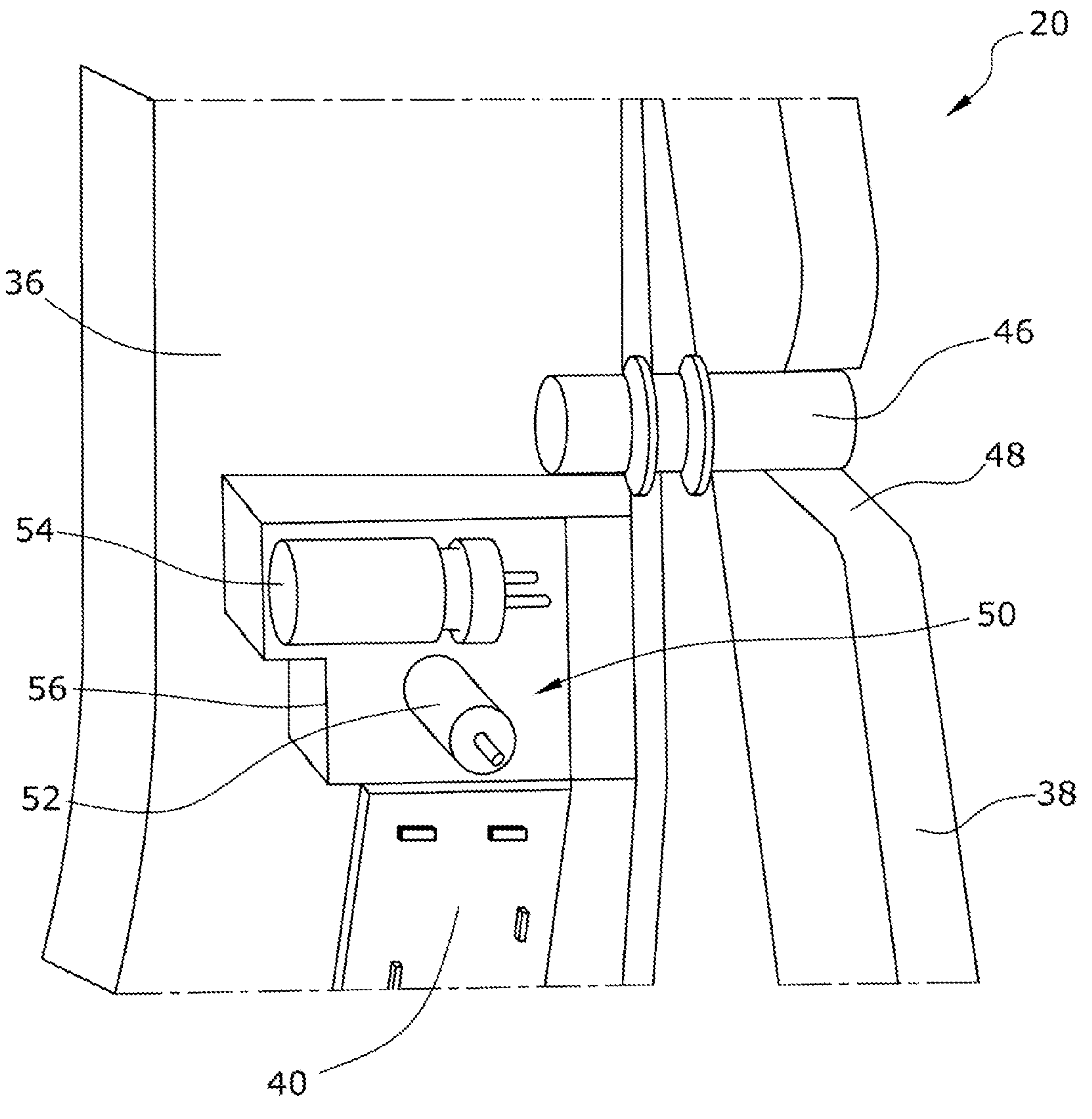
FIG. 4 shows a detailed transparent view of the coupling device of FIG. 3.

A coupling device 20 which in this case is intended to prevent damage to the transmitter 24 in the event of contact between the closing edge 8 and the floor surface 10 is shown in more detail in FIGS. 2 to 4.

FIG. 2 shows the coupling device 20 in an operating situation in which the door panel elements 4 of the door device 2 are in motion. The coupling device 20 provides a main body 34 which is attached to the left-hand door side region 14 of the lower door end region 8, here the closing edge. Two movably supported lever arms 36, 38 are provided at this main body 34. In the first lever arm 36, the transmitter 24 as well as control electronics 40 and a tilt switching arrangement 42 are provided, the function of which will be explained below. The second lever arm 38 has a contact element 44, which in the present embodiment is shown as a roller element. The contact element 44 in this case serves to contact the floor surface 10 when the door device 2 and thus the closing edge 8 approaches the floor surface 10. Connecting elements 46, 48 are provided to connect the two lever arms 36, 38 when they approach the floor surface 10 and thereby provide that the first lever arm 36 pivots together with the second lever arm 38. The connecting element 46 on the first lever arm 36 is here configured as a pin and the connecting element 48 on the second lever arm 38 is here configured as a groove. When the roller element 44 hits the floor surface 10, the pin 46 of the first lever arm 36 engages in the groove 48 of the second lever arm 38, so that the two lever arms 36, 38 are pivoted together during a further downward movement of the door device 2. To provide that the first lever arm 36 does not come into contact with the floor surface 10 in any operating situation, the second lever arm 38 provides a projection d relative to the first lever arm 36.

As already indicated, the first lever arm 36 provides a switching arrangement 42, which is here configured as a tilt switching arrangement, which makes the transmitter 24 current-free in a lower end position in which the closing edge 8 comes into contact with the floor surface 10. The tilt switching arrangement 42 in this case makes use of the gravitational force of the earth's gravitational field, wherein in the present case a switching element 50, which is configured as an tilt switch, is provided. This tilt switch 50 represents an electromechanical tilt switch which has a movably supported metal cylinder 52 which is moved from a current-conducting position to a current-free position when the lever arms 36, 38 are pivoted. The coupling device 20 also here provides the control electronics 40 for the sensor arrangement 28, which controls the sensor arrangement 28 in a known manner.

In order to prevent the door device 2 from being stopped in the event of the slightest vibrations and an associated pivoting of the lever arms 36, 38, a capacitor 54 is provided as part of the switching arrangement 42 to act as a current buffer to maintain the current flow for a few milliseconds. The tilt switch 50 and the capacitor 54 are arranged at a distance from the control electronics 40 in the first lever arm 36. They can, however, also be provided on the control electronics 40. It is also possible that a MEMS gravity sensor is provided instead of a tilt switch.

FIG. 4 shows a detailed transparent view of the coupling device 20. The pin 46 of the first lever arm 36, which engages in the groove 48 of the second lever arm 38 can here clearly be seen. The tilt switch 50 and the capacitor 54 are provided in a positioning element 56 which is clipped into the first lever arm 36 after pre-assembly. The electric connections to the control electronics 40 are provided in a known manner. If the second coupling device 22 also provides a tilt switching arrangement 42 of this type, redundancy for the sensor arrangement 28 is provided. The control electronics 40 are then reliably informed that the door device 2 is in an end position. In the case of door devices whose door panel elements 4 remain in an upper end position in the horizontal direction, guide surfaces can be provided which allow the lever arms 36, 38 of the coupling devices 20, 22 to be pivoted in order to also switch the sensor arrangement 28 current-free in an upper end position.

Figure 5:
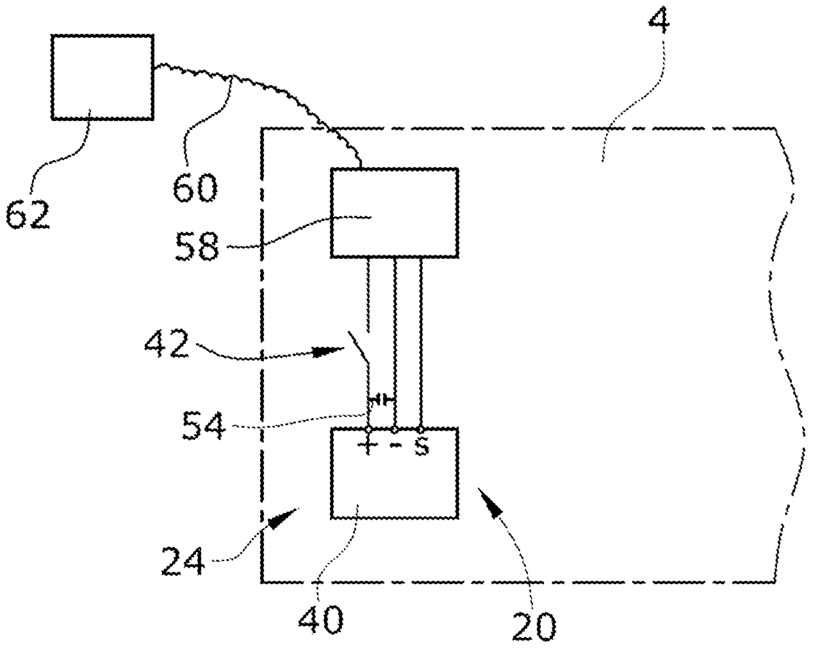
FIG. 5 shows a schematic view of a switching state of the coupling device.

FIG. 5 shows a schematic view of a switching state of the coupling device 20 in which the door device 2, and thus the door panel element 4, is in the lower end position, and consequently the switching arrangement 42 is also open and thus switched current-free. The reference sign 58 provides a door box which is also connected in a known manner for control purposes to the coupling device 22 and thus also to the receiver 26. The door box 58 is connected in a known manner to a door control 62 via a spiral cable 60.

It should also be noted that the inventive leading closing edge safety arrangement 12 is particularly suitable as a retrofit solution for existing door devices 2.

The present invention is not limited to embodiments described herein; reference should be had to the appended claims.

LIST OF REFERENCE NUMERALS

2 Door device
4 Door panel element
6 Guide rail
8 Lower door end region/Closing edge
10 Floor surface
12 Leading closing edge safety arrangement
14 Left-hand door side region
16 Right-hand door side region
20 Coupling device
22 Coupling device/Second coupling device
24 Transmitter
26 Receiver
28 Sensor arrangement
30 Optical signal path
32 Obstacle
34 Main body
36 First lever arm
38 Second lever arm
40 Control electronics
42 Switching arrangement/Tilt switching arrangement
44 Contact element/Roller element
46 Connecting element/Pin
48 Connecting element/Groove
50 Switching arrangement/Tilt switch
52 Supported metal cylinder
54 Capacitor
56 Positioning element
58 Door box
60 Spiral cable
62 Door control
d Projection

What is claimed is:

1. A leading closing edge safety arrangement for a vertically movable door device which comprises at least one door panel element and which comprises a lower door end region, the leading closing edge safety arrangement comprising:

a sensor arrangement for defining an optical signal path, the sensor arrangement comprising a coupling device on a left door side region of the lower door end region and a coupling device on a right door side region of the lower door end region wherein, a first one of the coupling devices comprises at least one transmitter, and a second one of the coupling devices comprises at least one receiver; and;

an optical signal path interrupting element arranged in or on the lower door end region, wherein, the first one of the coupling devices and/or the second one of the coupling devices comprise, as the optical signal path interrupting element, a switching arrangement which comprises at least one switch to be triggered, and the switching arrangement is configured to switch the at least one transmitter and/or the at least one receiver so that no current flows therethrough at least when the lower door end region is in a lower end position.

2. The leading closing edge safety arrangement as recited in claim 1, wherein the switching arrangement is a tilt switching arrangement which switches the at least one transmitter and/or the at least one receiver so that no current flows therethrough as a function of a position of the first one of the coupling devices and/or of the second one of the coupling devices, as the case might be, with respect to the earth's gravitational field.

3. The leading closing edge safety arrangement as recited in claim 2, wherein the tilt switching arrangement comprises a MEMS gravity sensor.

4. The leading closing edge safety arrangement as recited in claim 1, wherein the at least one switch is a tilt switch.

5. The leading closing edge safety arrangement as recited in claim 4, wherein the tilt switch is an electromechanical tilt switch which comprises a movable metal ball or a movable metal cylinder.

6. The leading closing edge safety arrangement as recited in claim 4, wherein at least one of the coupling devices comprises a control electronics for the sensor arrangement.

7. The leading closing edge safety arrangement as recited in claim 6, wherein the switching arrangement further comprises a capacitor as a current buffer accumulator.

8. The leading closing edge safety arrangement as recited in claim 7, wherein the tilt switch and the capacitor are arranged in a positioning element which is remote from the control electronics.

9. The leading closing edge safety arrangement as recited in claim 8, wherein the positioning member is preassembled and is detachably fixed or non-detachably fixed in at least one of the coupling devices.

10. The leading closing edge safety arrangement as recited in claim 1, wherein each of the coupling devices comprises, a main body which is attached to the left door side region or to the right door side region, as the case might be, two lever arms which are movably supported on the main body, and a connecting element which interconnects the two lever arms in an end position thereof.

11. The leading closing edge safety arrangement as recited in claim 10, wherein, for each of the coupling devices, the two lever arms are made up of a first lever arm and a second lever arm, the first lever arm comprises the at least one transmitter or the at least one receiver and the switching arrangement, and the second lever arm comprises a contact surface or a contact element to contact a floor surface, the second lever arm being longer than the first lever arm.

12. The leading closing edge safety arrangement as recited in claim 11, wherein the contact element is a roller element.

13. The leading closing edge safety arrangement as recited in claim 10, wherein each of the connecting elements comprises a pin and a groove.

14. A door device comprising the leading closing edge safety arrangement as recited in claim 1.

15. The door device as recited in claim 14, further comprising:

a plurality of sequential door panel elements which define a sectional door.

16. The door device as recited in claim 14, further comprising:

guide surfaces for the coupling devices.

* * * * *